United States Patent
Mannheim Astete et al.

(10) Patent No.: US 11,618,507 B2
(45) Date of Patent: Apr. 4, 2023

(54) OPAQUE LAMINATED VEHICLE ROOF WITH PANORAMIC GLAZED APPEARANCE

(71) Applicant: AGP AMERICA S.A., Ciudad de Panamá (PA)

(72) Inventors: Mario Arturo Mannheim Astete, Lima (PE); Charles Stephen Voeltzel, Lima (PE); Juan Pablo Suarez, Lima (PE)

(73) Assignee: AGP America S.A., Panama (PA)

( * ) Notice: Subject to any disclaimer, the term of this patent is extended or adjusted under 35 U.S.C. 154(b) by 49 days.

(21) Appl. No.: 16/499,699

(22) PCT Filed: Mar. 28, 2018

(86) PCT No.: PCT/IB2018/052152
§ 371 (c)(1),
(2) Date: Sep. 30, 2019

(87) PCT Pub. No.: WO2018/178905
PCT Pub. Date: Oct. 4, 2018

(65) Prior Publication Data
US 2020/0282705 A1    Sep. 10, 2020

Related U.S. Application Data

(60) Provisional application No. 62/479,288, filed on Mar. 30, 2017.

(30) Foreign Application Priority Data

Jul. 27, 2017    (CO) .................. NC2017/0007443

(51) Int. Cl.
*B32B 17/06*    (2006.01)
*B32B 7/12*    (2006.01)
(Continued)

(52) U.S. Cl.
CPC .............. *B62D 29/043* (2013.01); *B32B 7/12* (2013.01); *B32B 15/18* (2013.01); *B32B 17/061* (2013.01);
(Continued)

(58) Field of Classification Search
CPC ................................................ B32B 17/10036
See application file for complete search history.

(56) References Cited

U.S. PATENT DOCUMENTS

| | | |
|---|---|---|
| 3,652,379 A | 3/1972 | White |
| 5,645,940 A | 7/1997 | Teddington |

(Continued)

FOREIGN PATENT DOCUMENTS

| | | |
|---|---|---|
| CN | 107000423 A | 8/2017 |
| DE | 102014226529 A1 | 6/2016 |

(Continued)

OTHER PUBLICATIONS

"Mercedes-Benz tests switchable transparency roof for new SLK" ( https://newatlas.com/mercedes-benz-magic-sky-control-roof/16793/) Nov. 2, 2010.

(Continued)

*Primary Examiner* — Ian A Rummel
(74) *Attorney, Agent, or Firm* — The Morales Law Firm; Joseph L. Morales, Esq.

(57) ABSTRACT

The laminated glass panoramic roof is a popular although expensive option offered on a growing number of automobiles. Much of its appeal comes from the sleek modern appearance that it gives to the vehicle. The opaque laminated vehicle roof, by removing vision and optical requirements can be produced at a lower cost. The opaque laminated roof, by retaining a glass outer surface, maintains the same exterior appearance, aesthetic and much of the appeal of a conventional laminated glass panoramic roof. The opaque (Continued)

laminated vehicle roof also allows for the use of alternate materials which can further reduce cost and weight while adding additional features such as installation hardware, fasteners, lighting, antennas and solar cells to the roof.

20 Claims, 12 Drawing Sheets

(51) Int. Cl.
  *B32B 15/18* (2006.01)
  *B32B 17/10* (2006.01)
  *B62D 25/06* (2006.01)
  *B62D 29/04* (2006.01)
  *B60Q 3/74* (2017.01)
  *B60Q 1/44* (2006.01)
  *B60Q 1/34* (2006.01)

(52) U.S. Cl.
  CPC ........ *B32B 17/10* (2013.01); *B32B 17/10036* (2013.01); *B32B 17/10064* (2013.01); *B32B 17/1066* (2013.01); *B32B 17/10091* (2013.01); *B32B 17/10119* (2013.01); *B32B 17/10137* (2013.01); *B32B 17/10348* (2013.01); *B32B 17/10651* (2013.01); *B32B 17/10761* (2013.01); *B60Q 1/34* (2013.01); *B60Q 1/44* (2013.01); *B60Q 3/745* (2017.02); *B62D 25/06* (2013.01); *B32B 17/10174* (2013.01); *B32B 2307/4026* (2013.01); *B32B 2307/41* (2013.01); *B32B 2307/412* (2013.01); *B32B 2311/30* (2013.01); *B32B 2315/08* (2013.01); *B32B 2457/12* (2013.01); *B32B 2605/08* (2013.01)

(56) References Cited

U.S. PATENT DOCUMENTS

| | | | | |
|---|---|---|---|---|
| 7,597,388 | B1* | 10/2009 | Samuel | B60R 11/02 296/210 |
| 2002/0148255 | A1 | 10/2002 | Vandal | |
| 2006/0182980 | A1 | 8/2006 | Torr | |
| 2008/0070045 | A1 | 3/2008 | Torr | |
| 2008/0158448 | A1 | 7/2008 | Primal | |
| 2008/0261795 | A1* | 10/2008 | Prunchak | C03C 8/18 501/18 |
| 2009/0098354 | A1 | 4/2009 | Torr | |
| 2010/0189996 | A1 | 7/2010 | Torr | |
| 2011/0096555 | A1 | 4/2011 | Pires | |
| 2011/0226312 | A1 | 9/2011 | Böhm | |
| 2013/0082484 | A1* | 4/2013 | Wagner | B62D 31/00 296/210 |
| 2015/0129325 | A1 | 5/2015 | Shirai et al. | |
| 2015/0367782 | A1 | 12/2015 | Mannheim Astete et al. | |
| 2016/0243796 | A1 | 8/2016 | Mannheim Astete et al. | |
| 2016/0279904 | A1 | 9/2016 | Sienerth et al. | |
| 2017/0361576 | A1* | 12/2017 | Legrand | B32B 17/10036 |

FOREIGN PATENT DOCUMENTS

| | | |
|---|---|---|
| EP | 1644293 A2 | 4/2006 |
| EP | 1893541 A2 | 3/2008 |
| EP | 3034297 A1 | 6/2016 |
| EP | 1986848 B1 | 12/2017 |
| EP | 3303235 A2 | 4/2018 |
| GB | 2355428 A | 4/2001 |
| JP | 2004123424 A | 4/2004 |
| JP | 2008037403 A | 2/2008 |

OTHER PUBLICATIONS

"Class factory provides full glass solution" (http://en.jmtglass.com/article.php?id=97) Sep. 5, 2014.

"Solid-State NMR Characterisation of Borosilicate Glasses the Structure of Automobile Obscuration Enamel Glass" (https://warwick.ac.uk/fac/sci/physics/research/condensedmatt/nmr/members/phriab/conferences/posters/conference_poster_10_04_12_printed.pdf) Apr. 10, 2012.

"Looking into the future of Automotive Glass" (https://auto.economictimes.indiatimes.com/autologue/looking-into-the-future-of-automotive-glass/974) Oct. 23, 2015.

"Masai Panoramic Windows for Land Rover Defenders 90 and 110" (https://www.masai4x4.com/landrover-defender-panoramic-windows/panoramic-windows/) Apr. 30, 2011.

"Acoustic windshield helps in noise reduction" (https://medium.com/@WindshieldExperts/acoustic-windshield-helps-in-noise-reduction-2ffd7e0313b7) Dec. 1, 2016.

"Designing Glass for Style—Characteristics of Automotive Glass" (https://zbindendesign.wordpress.com/2014/07/01/designing-glass-for-style-characteristics-of-automotive-glass/) Jul. 1, 2014.

"Antennas for Automobiles" (https://cdn.intechopen.com/pdfs/38164/InTech-Antennas_for_automobiles.pdf) Aug. 1, 2012.

"Gallery: BMW 7 Series Sky Lounge panoramic roof" (https://paultan.org/2016/01/30/gallery-bmw-7-series-sky-lounge-panoramic-roof/) Jan. 30, 2016.

\* cited by examiner

OPAQUE LAMINATED VEHICLE ROOF WITH PANORAMIC GLAZED APPEARANCE

FIELD OF THE INVENTION

This invention relates to the field of automotive vehicle roofs.

BACKGROUND OF THE INVENTION

A popular option on new cars that has seen rapid growth over the last several years is the panoramic glass roof 14 (FIG. 1A and 1B). A vehicle so equipped has a roof that is comprised substantially of glass 2. The large panoramic glass roof 14 gives the vehicle an airy and luxurious look. In recent years, on models offered with a panoramic roof option in North American and Europe, the take rate has been in the 30% to 40% range. In China, the rate has been close to 100% on some models.

Interestingly, while the predecessor to the panoramic roof, the "sun roof", could be opened to let air in, panoramic roofs are often fixed in place and do not open. Models equipped with panoramic roofs that open utilize complicated and expensive mechanisms that tend to be prone to warranty issues. In addition, panoramic roofs sometimes do not let very much light into the vehicle. Due to the large surface area exposed to the sun, the panoramic roof is often designed to transmit less than 10% visible radiation and as little as possible infrared radiation so as to reduce the need for a shade, another added cost and potential warranty item, and to reduce the solar heat load. This may be one option that is purchased more for appearance and aesthetics rather than function.

A big part of the appeal of the panoramic roof comes from the sleek modern exterior appearance that it gives to the vehicle with one continuous expanse of glass starting at the rear of the hood, running up the windshield, across the roof and down the back to the start of the trunk or hatch. Another reason for its popularity is that even with a mechanical shade mechanism, head room is increased due to the elimination of the roof structural members 24 (FIGS. 2A and 2B).

Since the 1990s, all new vehicles sold in the USA have been subjected to the roof crush test. This test was initiated in recognition of the fact that approximately 30% of the tens of thousands of highway fatalities that occur every year are related to accidents where the vehicle rolls over. The failure of the roof is responsible for many of these deaths.

The roof crush test is conducted through the use of a specially designed machine. The vehicle is positioned on the machine and then locked in place at the rocker panels. A powerful hydraulic ram, with a large 72"×30" platen mounted at a 25 degree angle to horizontal, is used to apply force to the roof while data is recorded. The platen is moved at a rate of 5 mm per second until the roof has been displaced (crushed) by at least 127 mm. The roof rating is based upon the ratio of the maximum force applied to the vehicle curb weight. Vehicles with a ratio of four and above are rated as "good". A ratio of less than 2.5 is rated as "poor". All vehicle manufacturers strive to get a "good" rating as the test results are an important factor in the purchase decision of many consumers.

One of the drawbacks of the panoramic roof is that to maintain the structural integrity of a panoramic roof equipped vehicle, the vehicle structure must be reinforced in order to get a "good" rating on the roof crush test. This is sometimes because the panoramic roof option is introduced by the manufacturer after the vehicle design has been completed. Rather than making major structural and material changes, the same chassis is used for both the panoramic and non-panoramic vehicles. The roof sheet metal 18 (FIGS. 1A and 1B) is changed and additional bracing 24 (FIG. 2A and 2B) and reinforcement is added in other places on the panoramic models. This adds to the weight of the vehicle and the expense of the panoramic roof option. This is always true for after-market, dealer installed roofs.

Due to the cost of the glass, reinforcements and shade assemblies, the production cost can be high. For this reason the panoramic roof is often bundled with higher margin options as a part of an options package.

Clearly, it would be advantageous to have a lower cost option to the panoramic roof that could still capture the same level of appeal.

SUMMARY OF THE INVENTION

The invention is a substantially opaque laminated vehicle roof having the same exterior appearance and aesthetic appeal as a standard panoramic glass roof.

The laminated roof is comprised of an outer layer of glass, comprising one major surface of serving as the vehicle roof outer surface, laminated to an inner layer through the use of an adhesive/bonding layer positioned between and connecting major opposite faces of the inner layer and the outer layer. The inner layer can substantially comprise steel, aluminum, glass, carbon fiber, fiberglass or any other material suitable to provide the level of strength needed to support the exterior glass layer and meet the roof functional requirements. The opaque laminated vehicle roof comprises: an opaque adhesive/bonding layer, an opaque glass layer, an opaque film layer, an opaque coating layer, a paint layer, or a layer comprising an opaque material such as a metal, composite or plastic.

As the laminated roof is opaque, yield losses due to vision, optics and certain other defects are eliminated along with their associated cost. Embodiments making use of a metal in inner layers are not classified as safety glazing and thus are not required to meet the regulatory requirements for safety glazing. This can also have a major impact on cost. The laminated roof can be processed using the same equipment and processes that are used to produce a conventional panoramic glass roof allowing both to be produced in the same facility with no additional capital investment.

The opaque layer allows the laminated roof to be used for added value options not possible otherwise such as antennas, lighting and solar cells.

Advantages include:
Potential system weight savings between 30% and 50%.
Lower cost means to provide the exterior aesthetic of a panoramic roof.
Can use same body structure on all vehicles.
Can be equipped with solar cells.
Can be equipped with antennas.
Can be equipped with lighting.
Used in vehicle line offered with and without a panoramic roof, provides uniform look across platform.
Lower number of parts.
Increased headroom.
Lower cost due to not having vision requirements.
Lower cost due to elimination of shade.
Lower cost due to not requiring certification as safety glazing for some versions.
Improved solar control.

REFERENCE NUMERALS

Figure 1A:
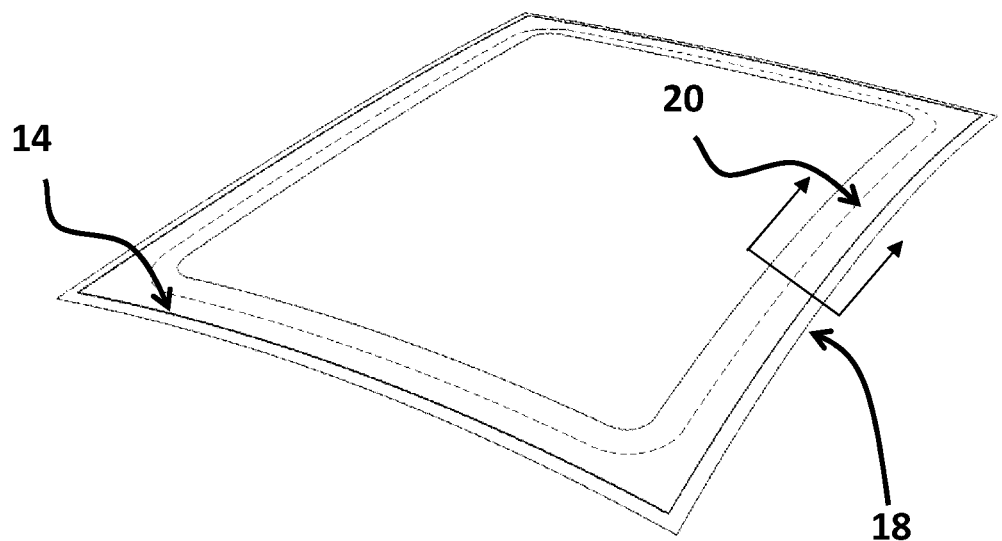
FIG. 1A shows a laminated panoramic roof and sheet metal opening in vehicle according to prior art.
Figure 1B:
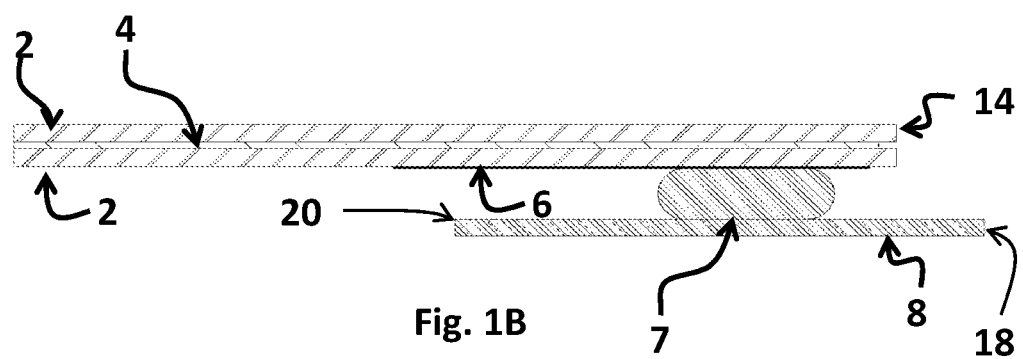
FIG. 1B shows a cross sectional of the laminated panoramic roof and sheet metal of FIG. 1A.
Figure 2A:
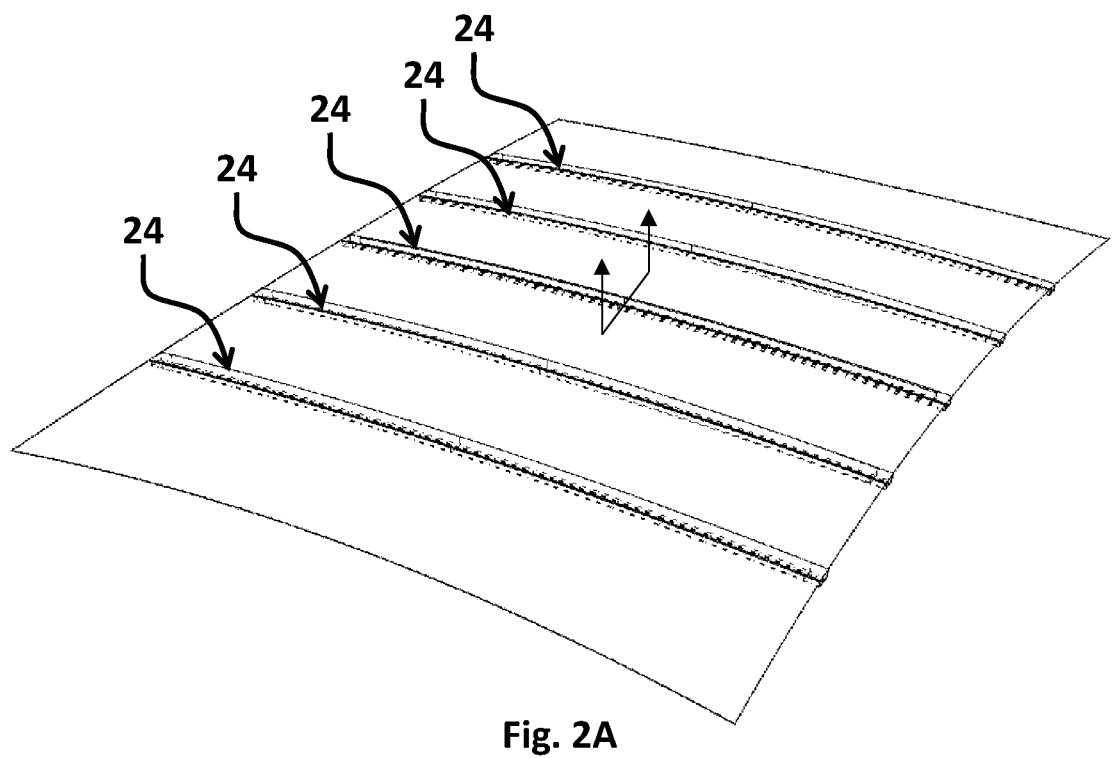
FIG. 2A shows a vehicle roof sheet metal with structural cross braces according to prior art.
Figure 2B:
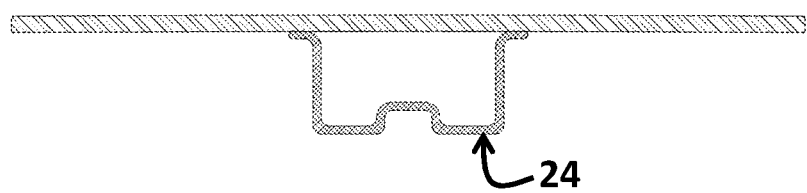
FIG. 2B shows a cross section of the vehicle roof sheet metal of FIG. 2A.

2 Glass layer
3 Infrared reflecting film layer
4 Bonding layer
5 Infrared reflecting layer
6 Paint layer
7 Adhesive
8 Steel
9 Opaque bonding layer
10 Fastener
12 Headliner
14 Panoramic glass roof
15 Scratch resistance coating
17 Anti-reflective coating
18 Roof Panel
20 Roof Panel Opening
24 Brace
27 Brake/Backup Light
28 Turn Signal
29 Dome Light
30 Door Light
31 Reading Light
32 Opening in opaque layer
34 Antenna
36 Solar Cell
101 Surface one
102 Surface two
103 Surface three
104 Surface four
201 Layer one—outer layer, adjacent to the exterior of the vehicle.
202 Layer two—inner layer, adjacent to the inside of the passenger compartment.

DETAILED DESCRIPTION OF THE INVENTION

The object of this invention is to provide an opaque laminated vehicle roof with the same appearance and aesthetics of a conventional glass panoramic roof. While the concept of an opaque glass window may appear to be counter-intuitive, much of the appeal of the conventional panoramic roof comes from the aesthetic of its appearance rather than its ability to admit light and air. Looking at conventional laminated glass panoramic roofs, we find that they are often fixed due to the complexity and cost of having glass that can move. In the case of these fixed glass roofs, only air is admitted. Due to their large surface area, conventional panoramic roofs do not provide abundant light due to the need for solar control.

While the requirements for optics and vision for roof glazing are minimal, as compared to those of a windshield, they are still a source of yield loss. In general, any part exhibiting noticeable transmitted and to an extent reflected distortion will be rejected. Likewise, any contamination inside of the laminate can result in rejection. By eliminating these as a source of rejects, cost is reduced.

As the roof does not have to be transparent, but only have an exterior glass surface, materials that are not transparent and that are not glass can be used as a part of the laminate. When the roof laminate does not use an interior glass layer, the laminate may not be classified as a safety glazing which also helps to reduce the production costs.

In some of the exemplary embodiments, the exterior glass layer is laminated to a 1 mm, 20 gauge steel layer. When a thin chemically tempered glass layer is used, a weight reduction in the range of 30% to 50% is possible as compared to a conventional glass laminate. When used in conjunction with chemically strengthened glass, the gauge of the sheet metal may be reduced to 0.5 mm or less for even more weight savings.

Significant weight and costs can be reduced if the vehicle chassis is designed so as to be able to pass the roof crush test with either a laminated opaque roof or a conventional glass roof installed in the same chassis.

When implemented across a model line, all of the vehicles are given the same slick exterior appearance and benefit from increased headroom.

The inside surface of the roof laminate can also comprise glass, giving the interior, as well as the exterior, the appearance and aesthetic of a panoramic roof.

Figure 3A:
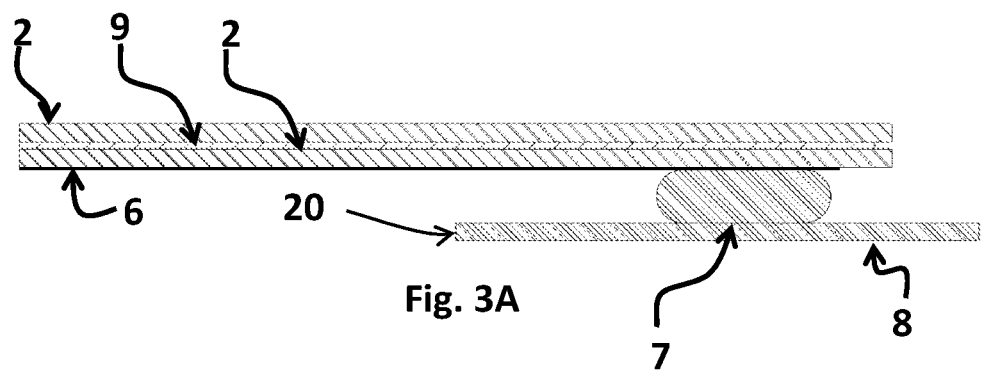
FIG. 3A shows a cross section of the vehicle roof with panoramic glazed aesthetic of FIG. 3B.
Figure 3B:
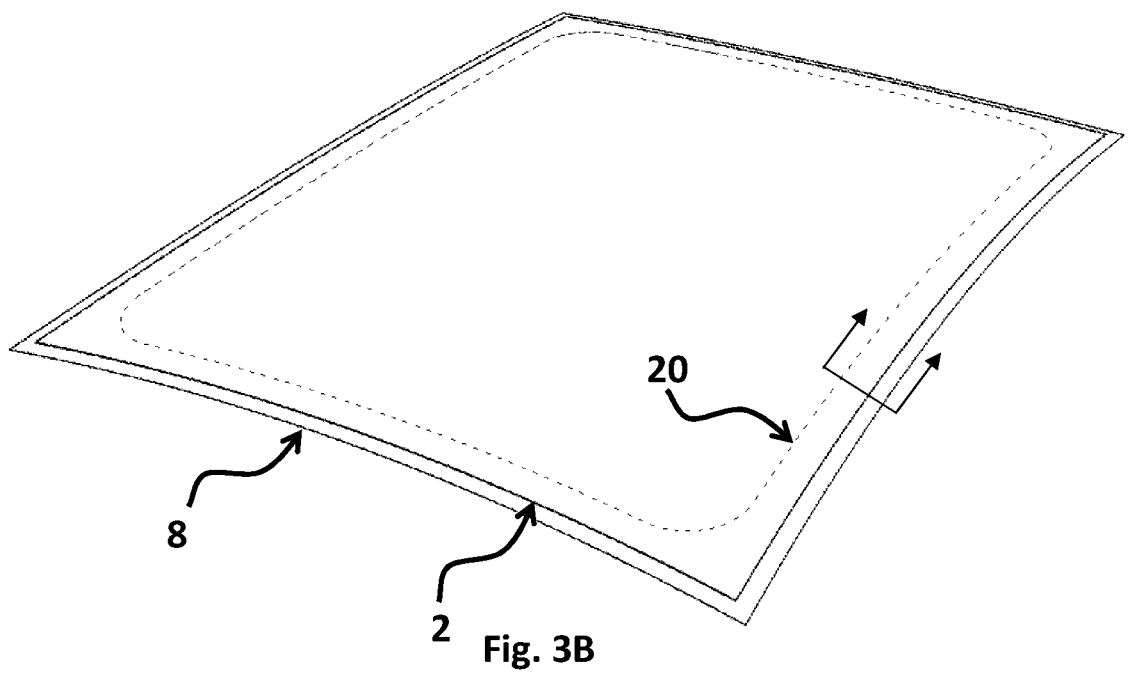
FIG. 3B shows a vehicle roof with panoramic glazed aesthetic perspective view.

In FIGS. 3A and 3B a roof panel 18 used for a glazed panoramic roof is shown with an opening 20 through which light may pass. Also, a 1 mm glass 2, a 0.76 mm black PVB layer 9, a 2.1 mm glass 2, a 6.0 mm adhesive 7 and a 1 mm steel 8 is shown. The panel comprises the mounting surface for a glazed panoramic roof and can also be used to mount the laminated roof of this invention. In this manner, very little needs to be done to adapt the manufacturing/assembly process. The same adhesive 7 system can be used to bond the laminated roof to the vehicle opening.

Figure 4A:
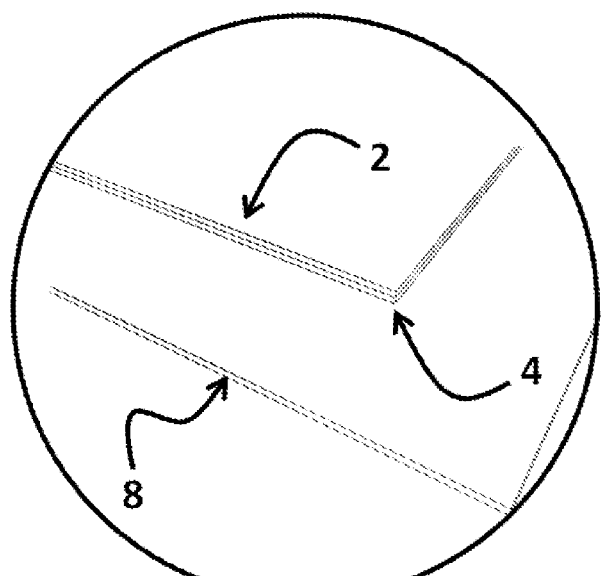
FIG. 4A shows a corner detail of the vehicle roof with panoramic glazed aesthetic of FIG. 4B.
Figure 4B:
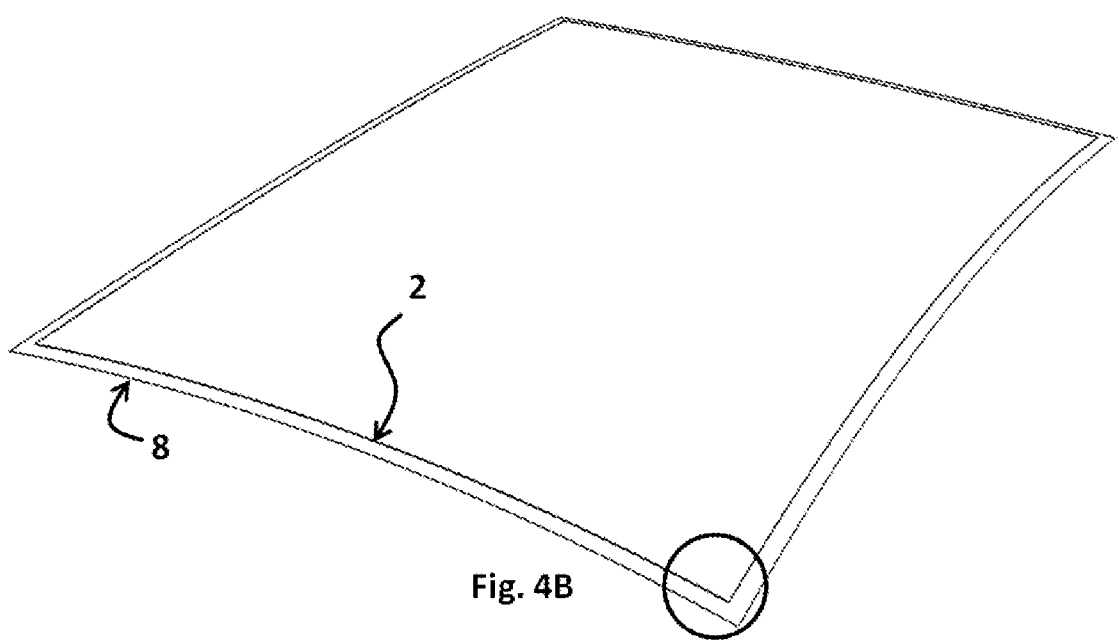
FIG. 4B shows a vehicle roof with panoramic glazed aesthetic with single glass layer bonded to metal layer.

In FIGS. 4A and 4B, a thin glass layer 2 is shown bonded by a bonding layer 4 to a thin steel layer 8.

The laminated roof can be supplied with other value added options as required. The opaque layer provides the opportunity for additional added value option that are not possible otherwise.

Figure 8:
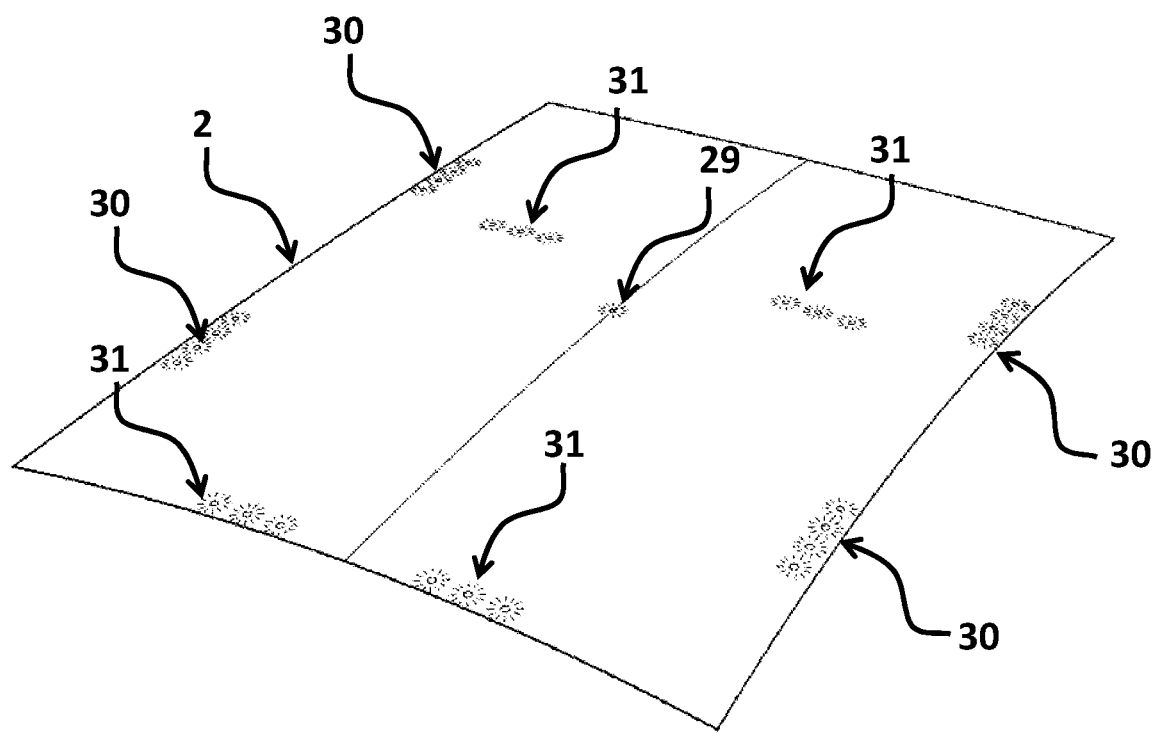
FIG. 8 shows a vehicle roof with panoramic glazed aesthetic with interior lighting.
Figure 9:
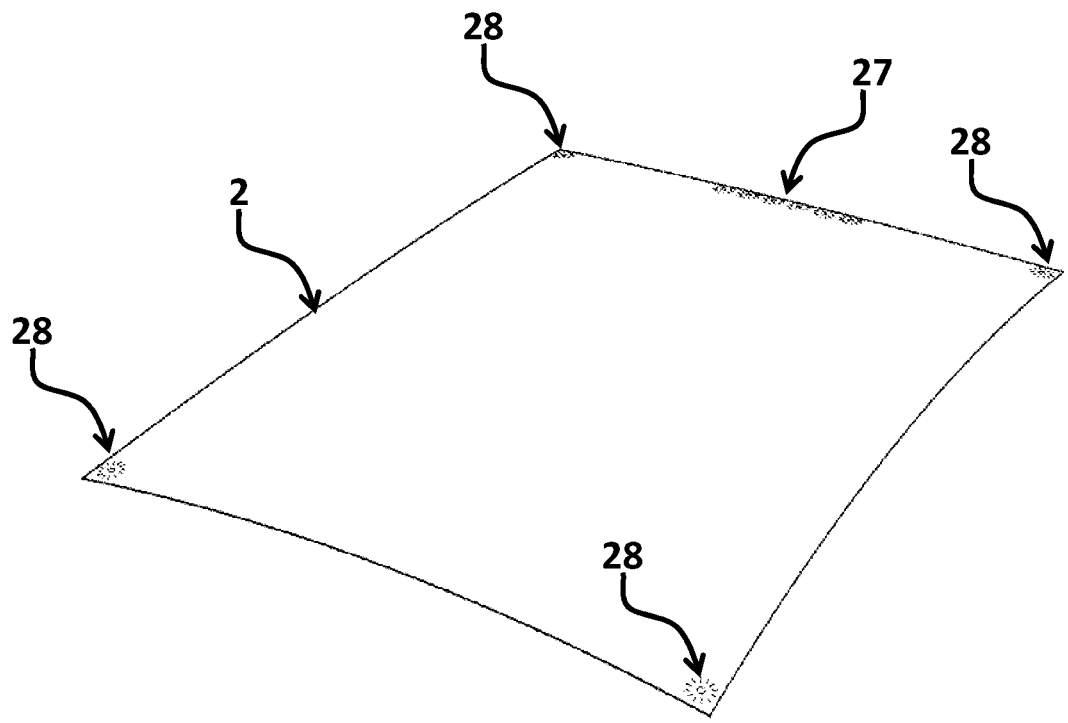
FIG. 9 shows a vehicle roof with panoramic glazed aesthetic with signal lighting.

Light sources, such as but not limited to: LEDs, electro-luminescent and OLED elements can be laminated inside of the roof. Light sources, oriented to radiate towards the interior, can be used to provide for interior illumination, replacing the typical dome 29, door lights 30 and reading lights 31 (FIG. 8) as well as other lighting applications that may not have been practical. Light sources, oriented to radiate towards the exterior, can provide primary signals, such as the high mounted brake light and supplemental brake 27/turn signal lights 28 (FIG. 9). Hidden behind the glass, the lights are nearly invisible when not turned on.

Figure 10:
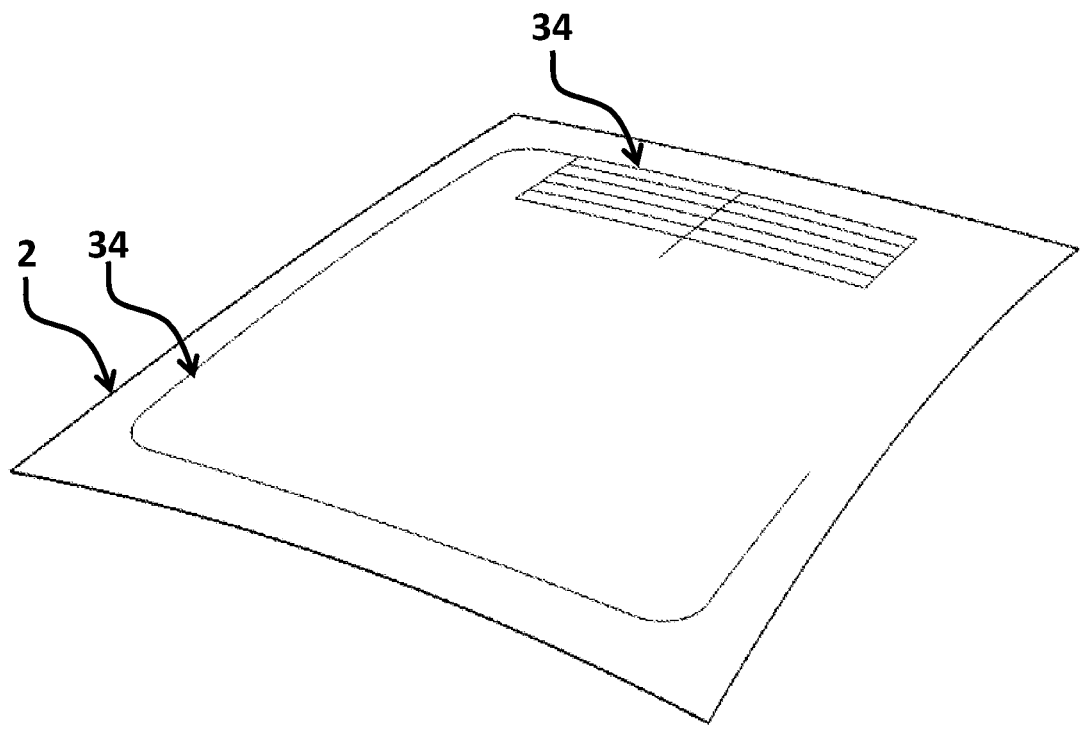
FIG. 10 shows a vehicle roof with panoramic glazed aesthetic with antenna.
Figure 11:
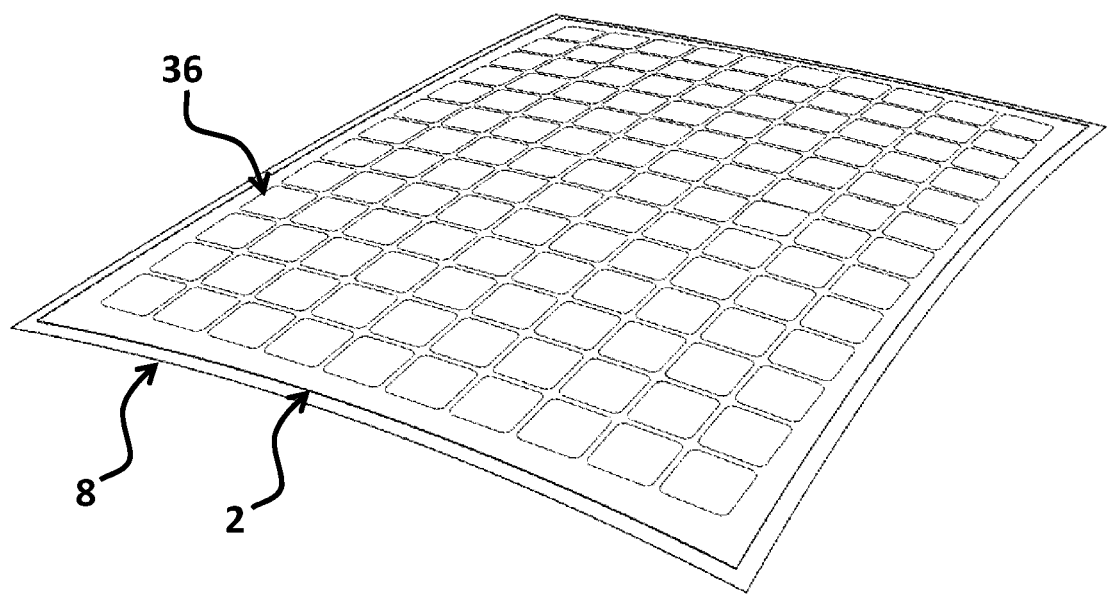
FIG. 11 shows a vehicle roof with panoramic glazed aesthetic with solar cells.

With a near horizontal orientation, the roof is also the perfect location for antennas 34 (FIG. 10) and solar cells 36 (FIG. 11).

Antennas can be formed in a number of ways. Screen print silver has been used since the early 1990s to apply antennas to automotive glass. Antennas can also be integrated into a conductive coating, applied to the glass or to a film layer. Thin conductive wires can also be embedded in the bonding layer.

On models where a headliner is needed, the headliner can be added as a part of the roof laminate or the roof laminate can be supplied with fasteners for the headliner already installed. Such fasteners include but are not limited to: hook-and-loop, adhesive strip, burr, touch, ribbed pin & socket, clips, springs and others known and any of the others commonly known and used in the art.

Glass options include but are not limited to: the common soda-lime variety typical of automotive glazing as well as aluminosilicate, lithium aluminosilicate, borosilicate, glass ceramics, and the various other inorganic solid amorphous compositions which undergo a glass transition and are classified as glass included those that are not transparent.

One of the big advantages of a laminated roof over a painted sheet metal roof is that the laminate can more efficiently reflect solar energy through the use of an infrared reflecting coating or film. Even without an infrared reflecting layer, glass will reflect more solar energy than a painted surface. Glass, being a poor heat conductor, also helps slowing down the solar energy transfer to the passenger cabin, while having an emissivity of over 0.9 it helps to cool a hot vehicle by radiating heat from the inside of the vehicle to the outside.

Infrared reflecting coatings include but are not limited to the various metal/dielectric layered coatings applied though vacuum deposition as well as others known in the art that are applied via pyrolytic spray, CVD and dip. Coated layers may have an opaque substrate or have an opaque layer opposite to the infrared reflecting layer. The opaque layer may also be created by printing an opaque ink onto the non-coated side of the substrate.

Infrared reflecting films includes both metallic coated substrates as well as organic based optical films which reflect infrared radiation. Film may also include an opaque coating or layer opposite to the infrared reflecting surface.

Figure 12:
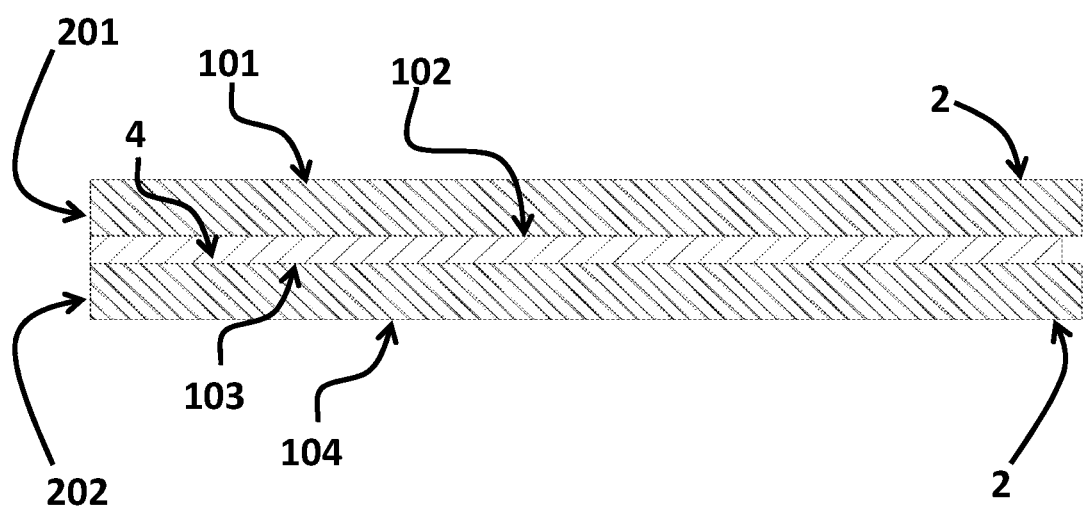
FIG. 12 shows a cross section of a typical laminated glazing.

Standard terminology is used to describe the configuration of a laminated glazing (FIG. 12). A normal automotive windshield is comprised of two layers of glass that are permanently bonded together. The glass surface that is on the outside of the vehicle is referred to as surface one 101 or the number one surface. The opposite face of the outer layer of glass 201 is surface two 102 or the number two surface. The glass surface that is on the inside of the vehicle is referred to as surface four 104 or the number four surface. The opposite face of the inside layer of glass 203 is surface three 103 or the number three surface.

The bonding layer 4 has the primary function of bonding the major faces of adjacent layers to each other. As an example, surface two 102 of the top glass layer 2 is bonded to surface one 101 of the layer adjacent and below by the bonding layer 4. The material selected is typically a clear plastic when bonding to another glass layer 2. For automotive use, the most commonly used bonding layer 4 or interlayer is polyvinyl butyl (PVB). In addition to polyvinyl butyl, ionoplast polymers, ethylene vinyl acetate (EVA), cast in place (CIP) liquid resin and thermoplastic polyurethane (TPU) can also be used. A wide variety of adhesives can be used when bonding glass to a non-glass layer 2 or when bonding non-glass layers.

The bonding layer can also serve as the opaque layer. Opaque PVB is available in black as well as a wide variety of other colors which can also be used. The opaque layer can also be created by printing with an opaque ink on the bonding layer.

Black frit is a type of ink made from a mix of high temperature black pigments, fine ground glass and an organic carrier and binder. Black frit is commonly applied by silk screen printing or ink jet printing and used on automotive glazing to provide for an obscuration to hide the interior trim and the adhesive used to mount the glazing in the vehicle. The fit is applied before the bending of the glass. During the bending process, the glass powder fuses with the surface of the glass making for a durable permanent bond. Black frit may be used to provide for the opaque layer required by printing on surface two 102 of the glass layer 2 or surface three 103 or four 104 of the roof laminate is comprises at least two glass layers.

Figure 13A:
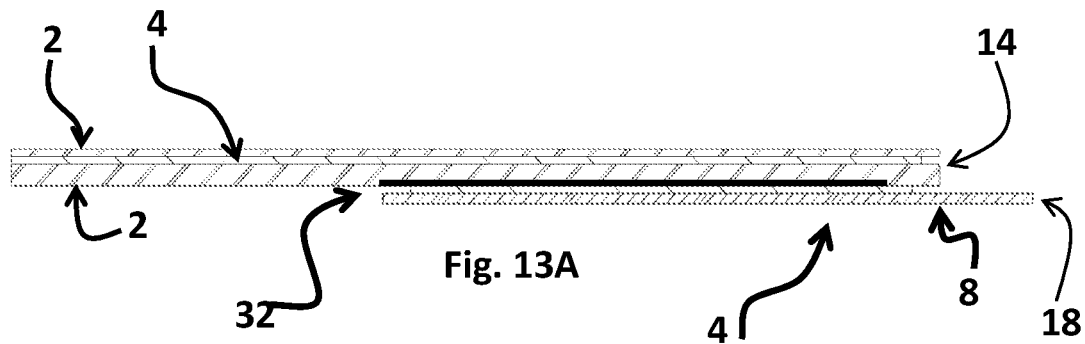
FIG. 13A shows a cross section of the vehicle roof with panoramic glazed aesthetic of FIG. 13B.
Figure 13B:
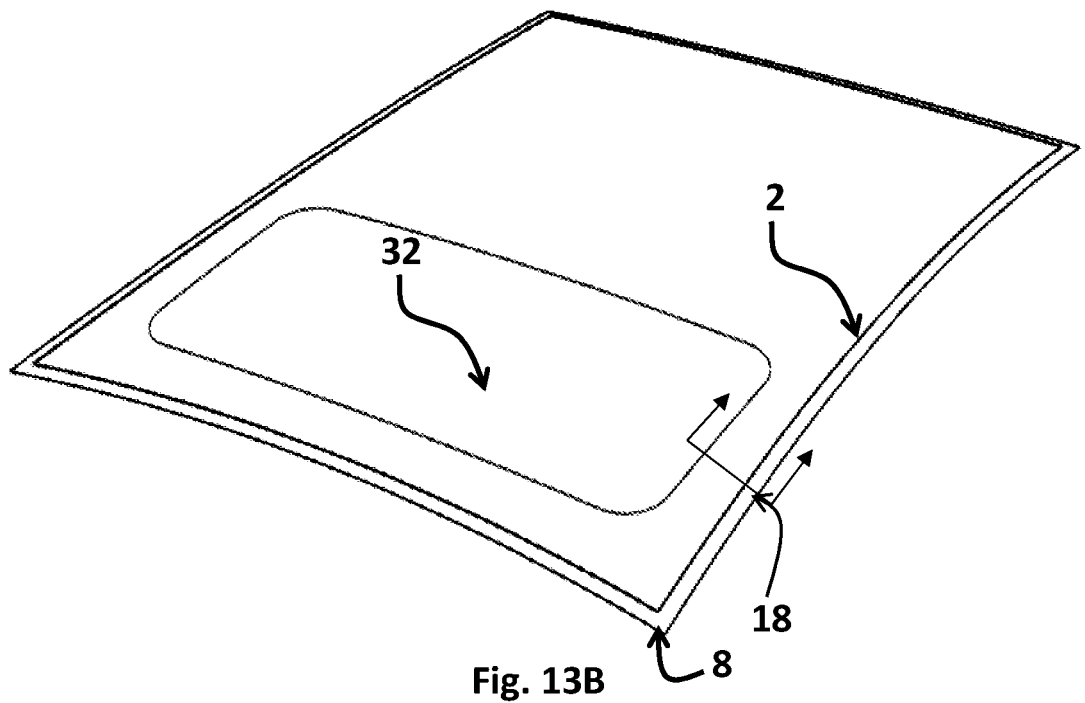
FIG. 13B shows a vehicle roof with panoramic glazed aesthetic with transparent in opaque layer.

Adhesives commonly used to mount glazing to openings in the opaque layers 32 include moisture cure polyurethanes (FIG. 13A and 13B). One of the drawbacks of the process is that the adhesive must be thick enough to accommodate the manufacturing variance of glass. This is because the shape tolerances for glass are larger than that of sheet metal. By laminating the glass 2 layer or layers to a steel 8 sheet and extending the steel sheet layer to accommodate mounting, the roof 14 can be mounted to the vehicle with a method that requires a smaller gap than with just glass on metal. The use of thin flexible glass layers also facilitates conformance of the glass to the steel layer.

There is a wide number of steel alloys that can be used. The embodiments envisioned would use the same types of double galvanized carbon steel as used for typical roof skins. As can be appreciated, the selection will depend upon the specific vehicle. While steel is envisioned, other equivalent materials such as aluminum, carbon fiber composite, fiberglass reinforced resin and even some plastics could be easily substituted.

The headliner is the body trim used to cover the roof structure. Typically it is made of a non-woven cloth with a backing to maintain its shape. The headliner needs to be removable to allow for repairs and replacement. In this case, the same type of fastener can be provided on the inside surface of the laminated roof as a value added option. The most common is the interlocking plastic finger type (Velcro) but many others are known in the art and can also be used.

Glazing, in the context of this invention, shall mean any safety glazing certified to any of the regulatory standards for automotive safety glazing.

Scratch resistance coatings are widely known in the art and typically used on transparent plastics such as automotive headlamp housings. A common type envisioned in the embodiments includes silica coatings applied using a magnetron sputtered vacuum deposition (MSVD) process or by a sol-gel process. As can be appreciated, other equivalent application methods are available and will become available. The scratch resistant coating is provided for additional protection.

Anti-reflective coating are widely known in the art. Antiglare coatings serve a similar function and are included. Coatings can be applied using a MSVD process, by a pyrolytic process or by a sol-gel process. Surface treatments can also be used to provide for an anti-glare surface. As can be appreciated, other equivalent treatments and application methods are available and will become available. An antireflective coating can be applied on the inner surface of glass on those embodiments comprising a glass inner layer 202.

Layers that are not composed of glass are formed using any of the methods and processes typical for the specific material and known in the art. As an example, a steel panel, intended for use in the laminated roof, may be formed through the use of a conventional metal stamping process.

Glass layers are formed using gravity bending, press bending or cold bending. Gravity and press bending methods for forming glass are well known in the art.

Figure 14:
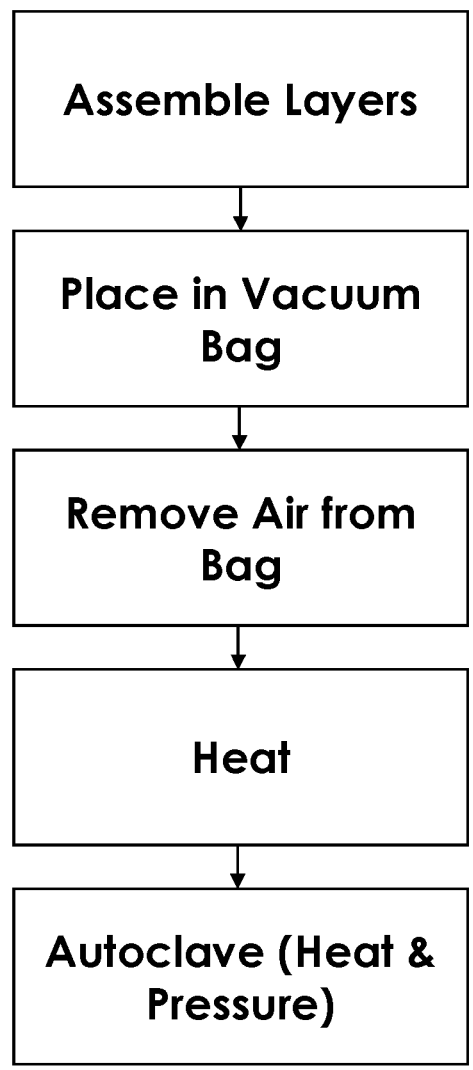
FIG. 14 shows a cold bending flow chart.

Cold bending, the steps of which are shown in FIG. 14, is a relatively new technology. As the name suggests, the glass is bent while cold to its final shape without the use of heat. This is possible because as the thickness of glass decreases, the sheets becomes increasingly more flexible and can be bent without inducing stress levels high enough to significantly increase the long term probability of breakage. Thin sheets of annealed soda-lime glass, with thicknesses of about 1 mm, can be bent to large radii cylindrical shapes (greater than 6 m). When the glass is chemically or heat strengthened, the glass is able to endure much higher levels of stress and can be bent along both major axis. The process is primarily used to bend chemically tempered thin glass sheets (<=1 mm) to shape. Cylindrical shapes can be formed with a radius in one direction of less than 4 meters. Shapes with complex bends, such as curvature in the direction of both principle axis, can be formed with a radius of curvature in each direction of as small as approximately 8 meters. Of course, much depends upon the surface area of the parts and the types and thicknesses of the substrates.

The cold bent glass will remain in tension and tend to distort the shape of the bent layer that it is bonded to. Therefore, the bent layer must be compensated to offset the tension. Metal substrates, with their greater strength and stiffness, are excellent substrates for cold bending. For more complex shapes with a high level of curvature, the flat glass may need to be partially thermally bent prior to cold bending.

The glass to be cold bent is placed with a bent-to-shape layer and with a bonding layer placed between the glass to be cold bent and the bent glass layer. The assembly is placed in what is known as a vacuum bag. The vacuum bag is an airtight set of plastic sheets, enclosing the assembly and bonded together at the edges, which allows for the air to be evacuated from the assembly and which also applies pressure on the assembly forcing the layers into contact. The assembly in the evacuated vacuum bag is then heated to be sealed. The assembly is next placed into an autoclave which heats it and applies high pressure, completing the cold bending process as the flat glass at this point has conformed to the shape of the bent layer and is permanently affixed.

Cold bending is used in all of the embodiments described in which the glass is 1 mm thick or less.

DETAILED DESCRIPTION OF THE EMBODIMENTS

Figure 5A:
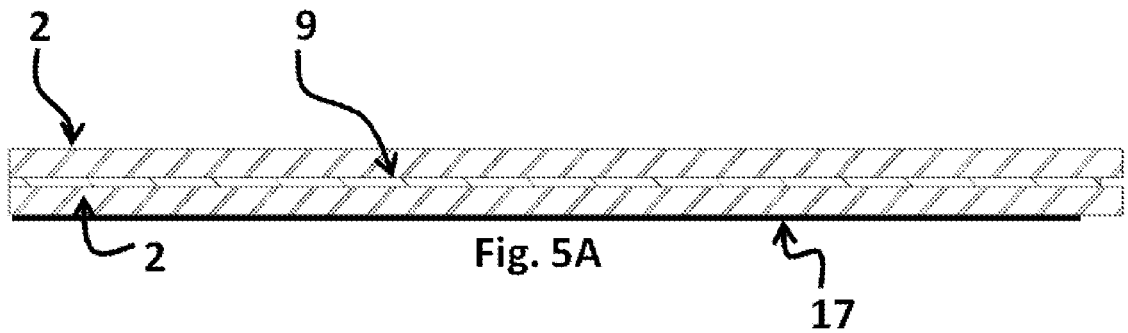
FIG. 5A shows a cross section of a panoramic roof according to embodiment 1

1. FIG. 5A shows a cross section of a panoramic roof comprising two 2.1 mm dark heat absorbing glass layers 2 laminated with a 0.76 mm layer 9 of opaque PVB. An anti-reflective coating layer 17 is applied to the number four surface 104 of the glass.

In this embodiment, the interior and exterior appearance of a laminated panoramic roof is preserved through the use of both inner and outer glass layers. Opacity is provided by an opaque black PVB layer. Only one dark heat absorbing layer is needed but two are used to simplify bending by using the same substrate for both layers. An anti-reflective coating is applied to the interior glass surface to reduce enhance aesthetics and reduce distracting reflections.

Figure 5B:
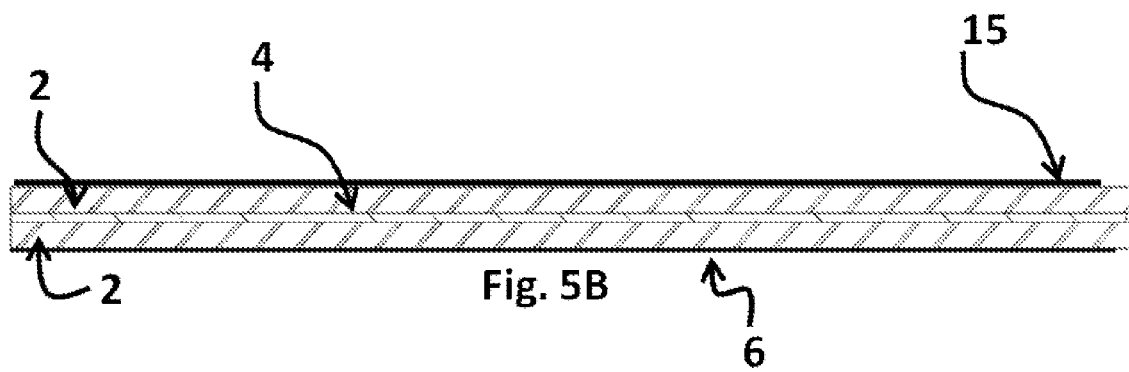
FIG. 5B shows a cross section of a panoramic roof according to embodiment 2

2. FIG. 5B shows a cross section of a panoramic roof comprising two 2.1 mm dark heat absorbing glass layers 2 laminated with a 0.76 mm layer 4 of clear PVB and with black paint 6 applied to the number four surface 104. A scratch resistance coating 15 layer is applied to the number one surface 101 of glass layer 201.

In this embodiment, the interior and exterior appearance of a laminated panoramic roof is preserved through the use of both inner and outer glass layers. Opacity is provided by opaque black enamel frit paint printed on the number four surface 104 which is also provided with an anti-reflective inner surface. A scratch resistant coating 15 is applied to the exterior glass surface 101 to enhance durability and protect the surface from roof rack mounted cargo.

Figure 5C:
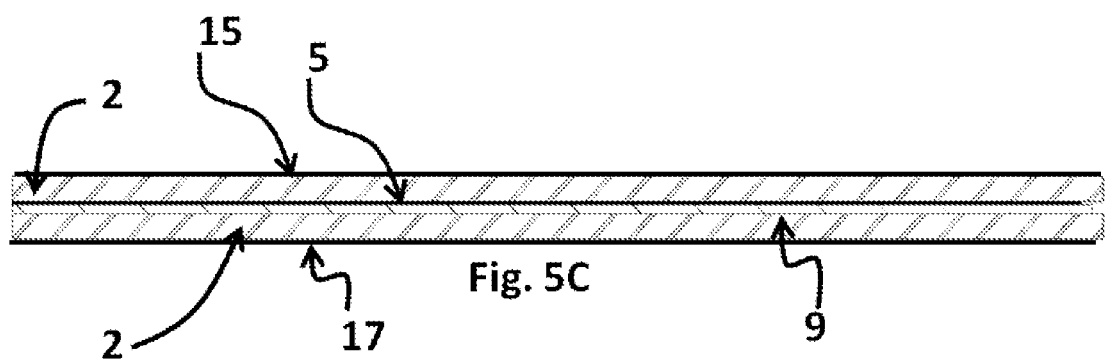
FIG. 5C shows a cross section of a panoramic roof according to embodiment 3

3. FIG. 5C shows a cross section of a panoramic roof comprising a 2.1 mm clear glass with an infrared reflecting layer 5 applied to the number two surface 102 laminated with a 0.76 mm layer 4 of opaque PVB to a 2.1 mm dark heat absorbing glass layer. A scratch resistance coating 15 is applied to the number one surface 101 of glass layer 201. An anti-reflective coating layer 17 is applied to the number four surface 104 of the glass layer 202.

In this embodiment, the interior and exterior appearance of a laminated panoramic roof is preserved through the use of both inner and outer glass layers. Opacity is provided by an opaque black PVB layer. An infrared coating is applied to the number two surface 102 of the exterior glass layer to improve solar load control. Anti-reflective and scratch resistant coating are also utilized.

Figure 5D:
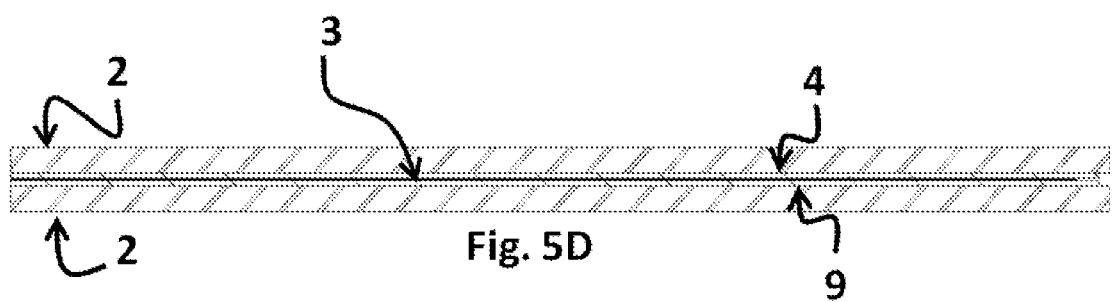
FIG. 5D shows a cross section of a panoramic roof according to embodiment 4

4. FIG. 5D shows a cross section of a panoramic roof comprising two 2.1 mm clear glass layers 2 laminated with a 0.4 mm layer 4 of clear PVB, an infrared reflecting film layer 3, a 0.4 mm layer 9 of opaque PVB 9.

In this embodiment, the interior and exterior appearance of a laminated panoramic roof is preserved through the use of both inner and outer glass layers. Opacity is provided by an opaque black PVB layer 9. An infrared reflecting film 3 is laminated between a thin clear PVB layer 4 and the opaque PVB layer 9 to improve solar load control.

Figure 6A:
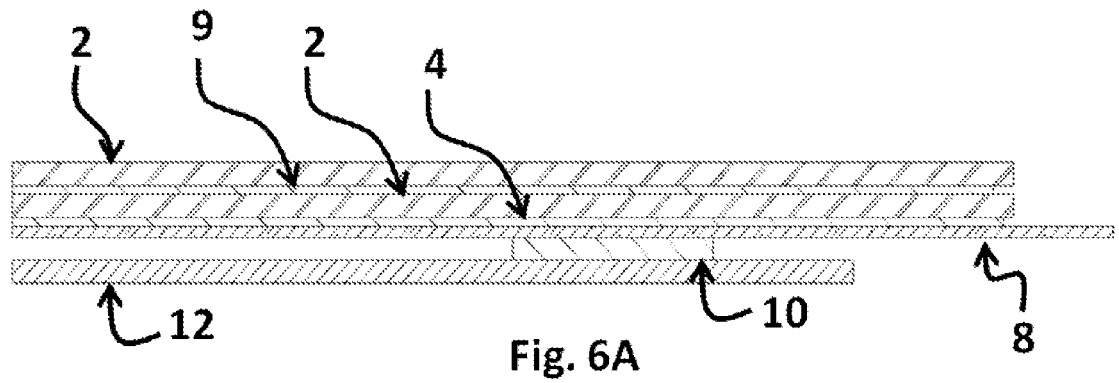
FIG. 6A shows a cross section of a panoramic roof according to embodiment 5

5. FIG. 6A shows a cross section of a panoramic roof comprising two 2.1 mm glass layers 2 laminated with a 0.76 mm layer 9 of opaque PVB. In this embodiment, an additional 1 mm steel layer 8 is laminated to the layer two 202 number four surface 104 with a 0.76 mm layer of clear PVB. Further, a fastener 10 and the headliner 12 are shown. Steel layer is extended beyond the edge of glass to facilitate installation in the vehicle.

In this embodiment, the exterior appearance of a laminated panoramic roof is preserved through the use of an exterior glass layer 201. A heat absorbing glass 2 is used for the outer layer 201 to improve solar load control. The exterior glass layer 201 is laminated to a second 2.1 mm glass layer 2 using a black PVB layer 9. The two laminated glass layers are further laminated to an additional 1 mm steel layer, using a clear PVB layer 4, with the number four 104 surface of the second glass layer laminated to the steel layer 202. The black PVB serves to obscure the steel layer and to give the roof a black appearance from the exterior. The steel provides for a higher level of structural support which can reduce the need for further reinforcement elsewhere in the vehicle structure. If needed, braces 24 can be attached to the steel 8 surface 202. In addition, the steel layer 202 can be provided with fasteners on the inner surface for attaching a headliner. The steel layer can also be extended beyond the edge of glass to facilitate installation in the vehicle.

Figure 6B:
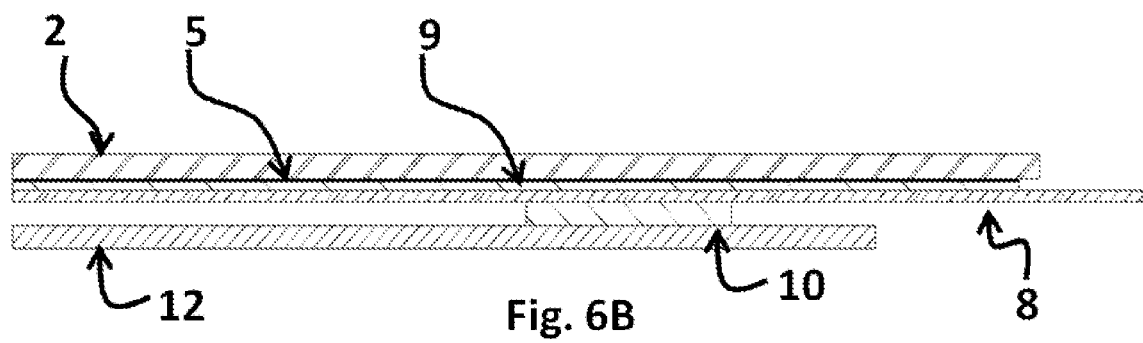
FIG. 6B shows a cross section of a panoramic roof according to embodiment 6

6. FIG. 6B shows a cross section of a panoramic roof comprising a single 2.1 mm clear glass 2 layer 201 with an infrared coating layer 5 on the number two surface 102 laminated with a 0.76 mm layer 9 of opaque PVB to a sheet of 1 mm steel 8. Further, a fastener 10 and the headliner 12 are shown. Steel layer 8 is extended beyond the edge of glass to facilitate installation in the vehicle.

In this embodiment, the exterior appearance of a laminated panoramic roof is preserved through the use of an exterior glass layer 201. The exterior glass layer 201 is laminated to a 1 mm steel layer using a black PVB layer. The black PVB serves to obscure the steel layer and to give the roof a black appearance from the exterior. The steel provides for a higher level of structural support which can reduce the need for further reinforcement elsewhere in the vehicle structure. If needed, braces 24 can be attached to the steel 8 surface 202. In addition, the steel layer 202 can be provided with fasteners 10 on the inner surface for attaching a headliner 12. The steel layer 8 can also be extended beyond the edge of glass to facilitate installation in the vehicle.

Figure 6C:
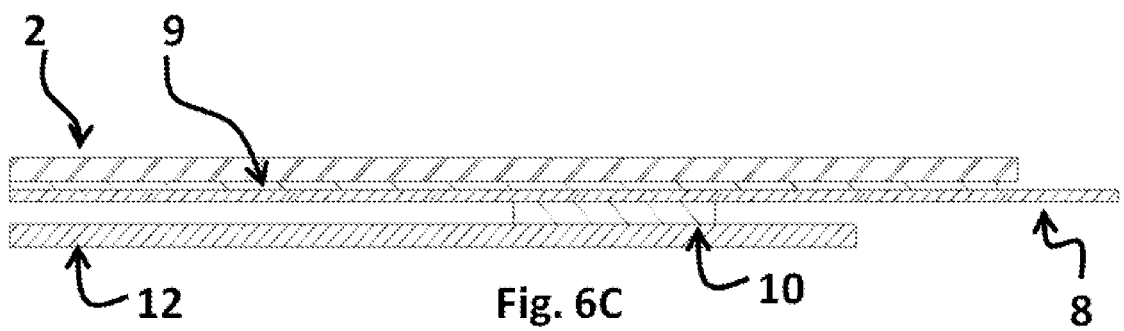
FIG. 6C shows a cross section of a panoramic roof according to embodiment 7

7. FIG. 6C shows a cross section of a panoramic roof comprising a single 2.1 mm dark heat absorbing glass 2 layer 201 laminated with a 0.76 mm layer 9 of opaque PVB to a layer of 1 mm steel 8. Further, a fastener 10 and the headliner 12 are shown. Steel layer is extended beyond the edge of glass to facilitate installation in the vehicle.

In this embodiment, the exterior appearance of a laminated panoramic roof is preserved through the use of an exterior glass layer 201. The exterior glass layer 201 is laminated to a 1 mm steel layer 202 using a black PVB layer 9. The black PVB 9 serves to obscure the steel layer and to give the roof a black appearance from the exterior. The steel 8 provides for a higher level of structural support than a glass layer would which can reduce the need for further reinforcement elsewhere in the vehicle structure. If needed, braces 24 can be attached to the steel surface 8. In addition, the steel layer 202 can be provided with fasteners 10 on the inner surface for attaching the headliner 12. The steel layer 8 can also be extended beyond the edge of glass to facilitate installation in the vehicle.

Figure 6D:
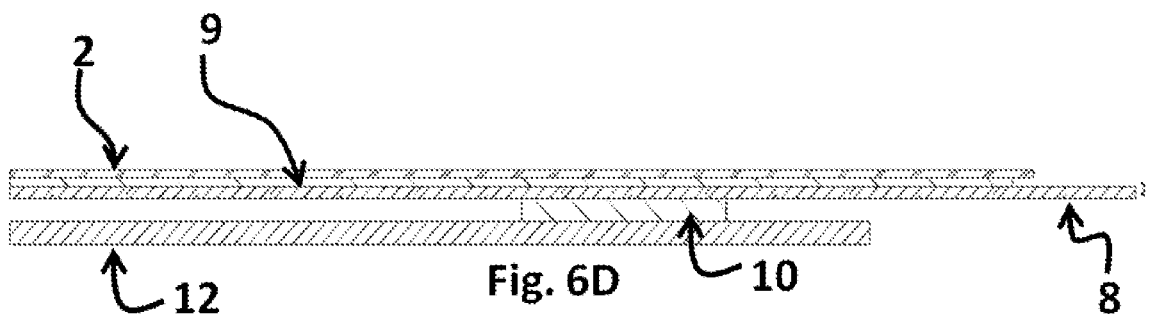
FIG. 6D shows a cross section of a panoramic roof according to embodiment 8

8. FIG. 6D shows a cross section of a panoramic roof comprising a single 1.0 mm chemically strengthened clear glass 2 layer 201 laminated with a 0.76 mm layer 9 of opaque PVB to a sheet of 1 mm steel 8. Further, a fastener 10 and the headliner 12 are shown. Steel layer is extended beyond the edge of glass to facilitate installation in the vehicle.

In this embodiment, the exterior appearance of a laminated panoramic roof is preserved through the use of an exterior glass layer 201. The thin light chemically tempered exterior glass 2 layer 201 is laminated to a 1 mm steel layer 202 using a black PVB layer 9. The black PVB 9 serves to obscure the steel layer and to give the roof a black appearance from the exterior. The steel 8 provides for a higher level of structural support that a glass layer would which can reduce the need for further reinforcement elsewhere in the vehicle structure. If needed, braces 24 can be attached to the steel 8 surface 202. In addition, the steel layer 202 can be provided with fasteners 10 on the inner surface for attaching the headliner 12. The steel layer 8 can also be extended beyond the edge of glass to facilitate installation in the vehicle.

Figure 7A:
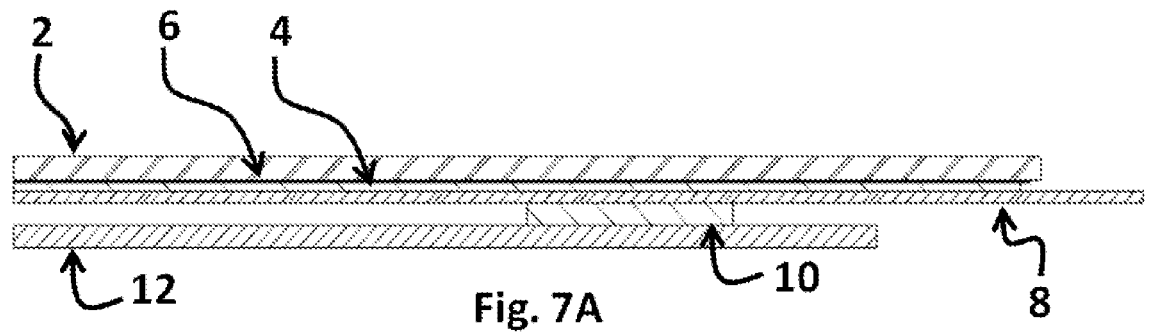
FIG. 7A shows a cross section of a panoramic roof according to embodiment 9

9. FIG. 7A shows a cross section of a panoramic roof comprising a single 2.1 mm dark heat absorbing glass 2 layer 201 with black paint printed on the number two surface 102 laminated with a 0.76 mm layer 4 of clear PVB to a sheet of 1 mm steel 8. Further, a fastener 10 and the headliner 12 are shown. Steel layer is extended beyond the edge of glass to facilitate installation in the vehicle.

In this embodiment, the exterior appearance of a laminated panoramic roof is preserved through the use of an exterior glass layer 201. The 2.1 mm dark heat absorbing layer exterior glass layer 201 is laminated to a 1 mm steel layer 202 using a clear PVB layer 4. Black paint 6 on the number two surface 102 of the glass layer 201 serves to obscure the steel layer and to give the roof a black appearance from the exterior. The steel 8 provides for a higher level of structural support that a glass layer would which can reduce the need for further reinforcement elsewhere in the vehicle structure. If needed, braces 24 can be attached to the surface of steel layer 8 of layer 202. In addition, the steel layer 202 can be provided with fasteners 10 on the inner surface for attaching the headliner 12. The steel layer 8 can also be extended beyond the edge of glass to facilitate installation in the vehicle.

Figure 7B:
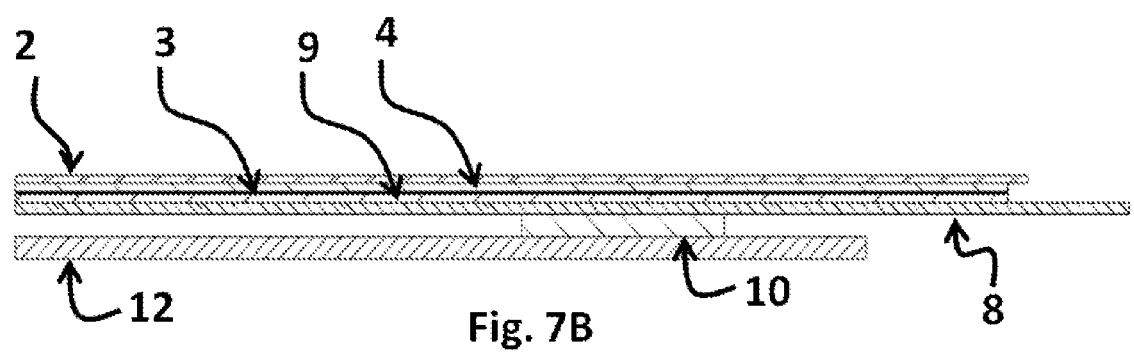
FIG. 7B shows a cross section of a panoramic roof according to embodiment 10

10. FIG. 7B shows a cross section of a panoramic roof comprising a single 1.0 mm chemically strengthened clear glass 2 layer 201 laminated with a 0.4 mm layer 4 of clear PVB, an infrared reflecting film layer 3, a 0.4 mm layer 9 of opaque PVB 9 and the two further laminated to a layer 202 of 1 mm steel 8. Further, a fastener 10 and the headliner 12 are shown. Steel layer is extended beyond the edge of glass to facilitate installation in the vehicle.

In this embodiment, the exterior appearance of a laminated panoramic roof is preserved through the use of an exterior glass layer 201. A clear, thin, light, 1 mm chemically strengthened glass exterior glass layer 201 is laminated to a steel 8 layer 202. An infrared reflecting film is laminated using a clear 0.4 mm PVB layer 4 between the film and the glass and an opaque 0.4 mm PVB layer 6 between the film 3 and the steel 8. The film serves to improve solar load control. The opaque black PVB layer 6 give the roof a black appearance from the exterior.

Figure 7C:
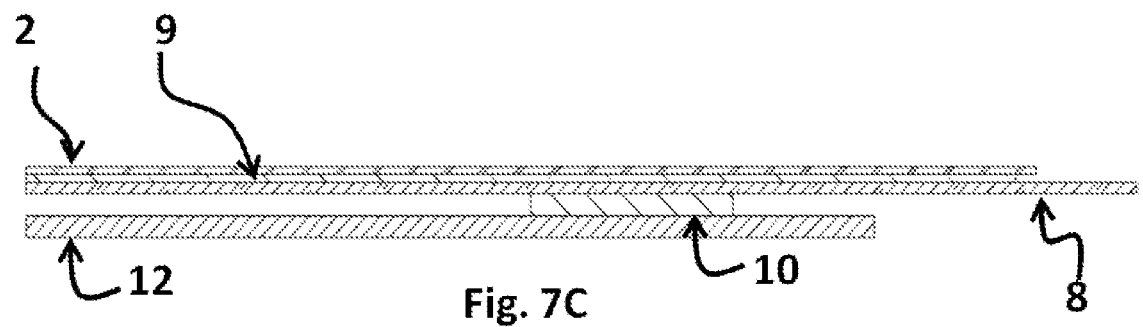
FIG. 7C shows a cross section of a panoramic roof according to embodiment 11

11. FIG. 7C shows a cross section of a panoramic roof comprising a single 1.0 mm chemically strengthened clear glass 2 layer 201 laminated with a 0.76 mm opaque PVB 9 and further laminating layers 201 and 202 to a layer of 1 mm steel 8. Further, a fastener 10 and the headliner 12 are shown. The steel layer 2 is extended beyond the edge of glass to facilitate installation in the vehicle.

In this embodiment, the exterior appearance of a laminated panoramic roof is preserved through the use of an exterior glass layer 201. A clear, thin, light, 1 mm chemically strengthened glass exterior glass layer 201 is laminated to a steel 8 layer 202 using an opaque 0.76 mm PVB layer 4 between the glass 2 and the steel 8 layers. The opaque black PVB layer 6 give the roof a black appearance from the exterior. The steel layer is extended beyond the edge of glass to facilitate installation in the vehicle.

Figure 7D:
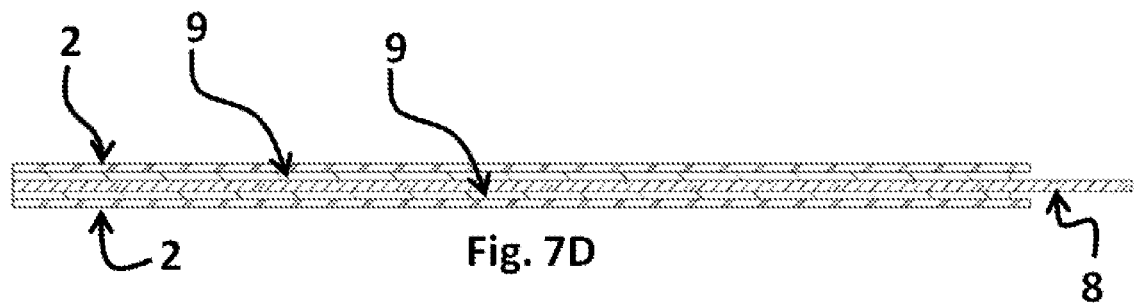
FIG. 7D shows a cross section of a panoramic roof according to embodiment 12

12. FIG. 7D shows a cross section of a panoramic roof comprising a single 1.0 mm chemically strengthened clear glass 2 layer 201 laminated with a 0.76 mm opaque PVB 9 and further laminating layers 201 and 202 to a layer of 1 mm steel 8. Further, a fastener 10 and the headliner 12 are shown. The steel layer 2 is extended beyond the edge of glass to facilitate installation in the vehicle.

In this embodiment, the interior and exterior appearance of a laminated panoramic roof is preserved through the use of both inner and outer glass layers. Two thin, light, clear, 1 mm chemically tempered glass layers are laminated to either side of a steel layer using black opaque 9 0.76 mm PVB. The steel layer 2 is extended beyond the edge of glass to facilitate installation in the vehicle.

What is claimed is:

1. An opaque laminated vehicle roof, comprising:
   a first glass layer having first and second oppositely disposed major faces with the first major face of said first glass layer serving as an outer surface of the vehicle;
   an additional layer, having first and second oppositely disposed major faces; and
   a non-transparent adhesive layer having first and second oppositely disposed major faces, said at least one adhesive layer being positioned between and affixing opposite major surfaces of adjacent layers to each other;
   wherein the additional layer is substantially made of glass, and
   wherein the opacity of the opaque laminate is provided by the non-transparent adhesive layer.

2. The vehicle roof of claim 1, further comprising a heat reflecting layer, a heat absorbing layer and/or a sound deadening layer.

3. The vehicle roof of claim 1, further comprising a hard scratch resistant coating on the first major face of the first glass layer and/or an anti-reflective coating on the second major face of the first glass layer.

4. The vehicle roof of claim 1 further comprising at least one component selected from the group consisting of: an antenna, a light source and a solar cell.

5. A vehicle comprising the vehicle roof of claim 1.

6. The vehicle roof of claim 1, wherein the non-transparent adhesive layer is a black PBV.

7. An opaque laminated vehicle roof, comprising:
   a first glass layer having first and second oppositely disposed major faces with the first major face of said first glass layer serving as an outer surface of the vehicle;
   an additional layer, having first and second oppositely disposed major faces; and
   an adhesive layer having first and second oppositely disposed major faces, said at least one adhesive layer being positioned between and affixing opposite major surfaces of adjacent layers to each other;
   wherein the additional layer is a non-transparent glass layer comprising a paint layer; and
   wherein the opacity of the opaque laminate is provided by the paint layer provided on a mayor surface of the glass.

8. The vehicle roof of claim 7, further comprising a heat reflecting layer, a heat absorbing layer and/or a sound deadening layer.

9. The vehicle roof of claim 7, further comprising an infrared reflecting layer which is selected from the group consisting of an infrared reflecting coating and an infrared reflecting film.

10. The vehicle roof of claim 7, further comprising a hard scratch resistant coating on the first major face of the first glass layer and/or an anti-reflective coating on the second major face of the first glass layer.

11. The vehicle roof of claim 7, wherein the paint layer is a black enamel frit paint layer.

12. . The vehicle roof of claim 7, further comprising at least one component selected from the group consisting of: an antenna, a light source and a solar cell.

13. An opaque laminated vehicle roof, comprising:
   a first glass layer having first and second oppositely disposed major faces with the first major face of said first glass layer serving as an outer surface of the vehicle;
   an additional layer, having first and second oppositely disposed major faces; and
   at least one adhesive layer having first and second oppositely disposed major faces, said at least one adhesive layer being positioned between and affixing opposite major surfaces of adjacent layers to each other;
   wherein the opacity of the opaque laminate is provided by at least one of said layers, and
   wherein said additional layer is substantially made using a material selected from the group consisting of: metal, steel, aluminum, steel alloy and carbon composite.

14. The vehicle roof of claim 13, further comprising a second glass layer, wherein the second glass layer is disposed between the first glass layer and the additional layer, or wherein the additional layer is disposed between first and second glass layers.

15. The vehicle roof of claim 13, further comprising a heat reflecting layer, a heat absorbing layer and/or a sound deadening layer.

16. The vehicle roof of claim 13, wherein said additional layer comprises a metal or steel-based layer having an opening on it.

17. The vehicle roof of claim 13, further comprising an infrared reflecting layer which is selected from the group consisting of an infrared reflecting coating and an infrared reflecting film.

18. The vehicle roof of claim 13, further comprising a hard scratch resistant coating on the first major face of the first glass layer and/or an anti-reflective coating on the second major face of the first glass layer.

19. The vehicle roof of claim 13, further comprising at least one component selected from the group consisting of: an antenna, a light source and a solar cell.

20. The vehicle roof of claim 13, wherein the additional layer is extended beyond the edge of the first glass layer.

* * * * *